United States Patent
Zhang et al.

(10) Patent No.: US 10,952,103 B2
(45) Date of Patent: Mar. 16, 2021

(54) TRANSMISSION OPPORTUNITY (TXOP) STRUCTURE FOR NEW RADIO-UNLICENSED (NR-U) AND NEW RADIO-SYNCHRONIZED SHARING (NR-SS)

(71) Applicant: QUALCOMM Incorporated, San Diego, CA (US)

(72) Inventors: Xiaoxia Zhang, San Diego, CA (US); Srinivas Yerramalli, San Diego, CA (US); Arumugam Chendamarai Kannan, San Diego, CA (US); Tamer Kadous, San Diego, CA (US); Taesang Yoo, San Diego, CA (US); Jing Sun, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/426,943

(22) Filed: May 30, 2019

(65) Prior Publication Data
US 2020/0008107 A1    Jan. 2, 2020

(30) Foreign Application Priority Data
Jun. 27, 2018  (IN) .............................. 201841023971

(51) Int. Cl.
| | | |
|---|---|---|
| *H04W 28/26* | (2009.01) | |
| *H04W 74/08* | (2009.01) | |
| *H04L 5/00* | (2006.01) | |
| *H04W 24/08* | (2009.01) | |
| *H04W 8/24* | (2009.01) | |

(52) U.S. Cl.
CPC ............ *H04W 28/26* (2013.01); *H04L 5/0094* (2013.01); *H04W 8/24* (2013.01); *H04W 24/08* (2013.01); *H04W 74/0808* (2013.01)

(58) Field of Classification Search
CPC ...................... H04W 282/26; H04W 72/0446
See application file for complete search history.

(56) References Cited

U.S. PATENT DOCUMENTS

| | | | |
|---|---|---|---|
| 10,645,606 B2* | 5/2020 | Fujishiro | ............... H04W 16/06 |
| 2018/0115907 A1 | 4/2018 | Damnjanovic et al. | |
| 2018/0160313 A1 | 6/2018 | Montojo et al. | |
| 2018/0176787 A1 | 6/2018 | Fakoorian et al. | |

OTHER PUBLICATIONS

International Search Report and Written Opinion—PCT/US2019/034877—ISA/EPO—dated Aug. 12, 2019.

* cited by examiner

*Primary Examiner* — Chandrahas B Patel
(74) *Attorney, Agent, or Firm* — Liem T. Do

(57) ABSTRACT

Wireless communications systems and methods related to communicating in a shared communication medium with flexible scheduling are provided. A first wireless communication device communicates, with a second wireless communication device during a reservation period, a channel reservation request for a first transmission opportunity (TXOP) in a spectrum. The first wireless communication device communicates, with the second wireless communication device during a response period in response to the channel reservation request, a channel reservation response. The first wireless communication device communicates, with a third wireless communication device during a first time period between the reservation period and the response period, a first communication signal.

30 Claims, 9 Drawing Sheets

TRANSMISSION OPPORTUNITY (TXOP) STRUCTURE FOR NEW RADIO-UNLICENSED (NR-U) AND NEW RADIO-SYNCHRONIZED SHARING (NR-SS)

CROSS REFERENCE TO RELATED APPLICATIONS

The present application claims priority to and the benefit of Indian Provisional Patent Application No. 201841023971, filed Jun. 27, 2018, which is hereby incorporated by reference in its entirety as if fully set forth below and for all applicable purposes.

TECHNICAL FIELD

This application relates to wireless communication systems, and more particularly to communicating in a shared communication medium with flexible scheduling.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a preamble to reserve a transmission opportunity (TXOP) in the shared channel and communicate with a receiving node during the TXOP. The preamble may be referred to as a clear-to-send-to self (CTS2self) signal. In some instances, the preamble may include network allocation vector (NAV) information to provide further reservation information (e.g., a duration of the reservation). One drawback of such an approach is that the transmit-based LBT may not accurately capture interference at the receiving node, and thus may result in hidden node interference.

To overcome hidden node interference, the receiving node may also listen to the channel and respond to the reservation when there is no transmission detected from the listening. The transmitting node may proceed with the transmission when a response is received from the receiving node. The receiving node may require a certain amount of time to process the reservation received from the transmitting node and to prepare for the transmission of the response. Depending on the wireless communication technology, the operational mode, and/or the receiving node's capabilities, the overhead associated with the reservation and response can be significant.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device during a reservation period, a channel reservation request for a first transmission opportunity (TXOP) in a spectrum; communicating, by the first wireless communication device with the second wireless communication device during a response period in response to the channel reservation request, a channel reservation response; and communicating, by the first wireless communication device with a third wireless communication device during a first time period between the reservation period and the response period, a first communication signal.

In an additional aspect of the disclosure, an apparatus includes a transceiver configured to communicate, with a first wireless communication device during a reservation period, a channel reservation request for a first transmission opportunity (TXOP) in a spectrum; communicate, with the first wireless communication device during a response period in response to the channel reservation request, a channel reservation response; and communicate, with a second wireless communication device during a first time period between the reservation period and the response period, a first communication signal.

In an additional aspect of the disclosure, a computer-readable medium having program code recorded thereon, the program code includes code for causing a first wireless communication device to communicate, with a second wireless communication device during a reservation period, a channel reservation request for a first transmission opportunity (TXOP) in a spectrum; code for causing the first wireless communication device to communicate, with the second wireless communication device during a response period in response to the channel reservation request, a channel reservation response; and code for causing the first wireless communication device to communicate, with a third wireless communication device during a first time period between the reservation period and the response period, a first communication signal.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
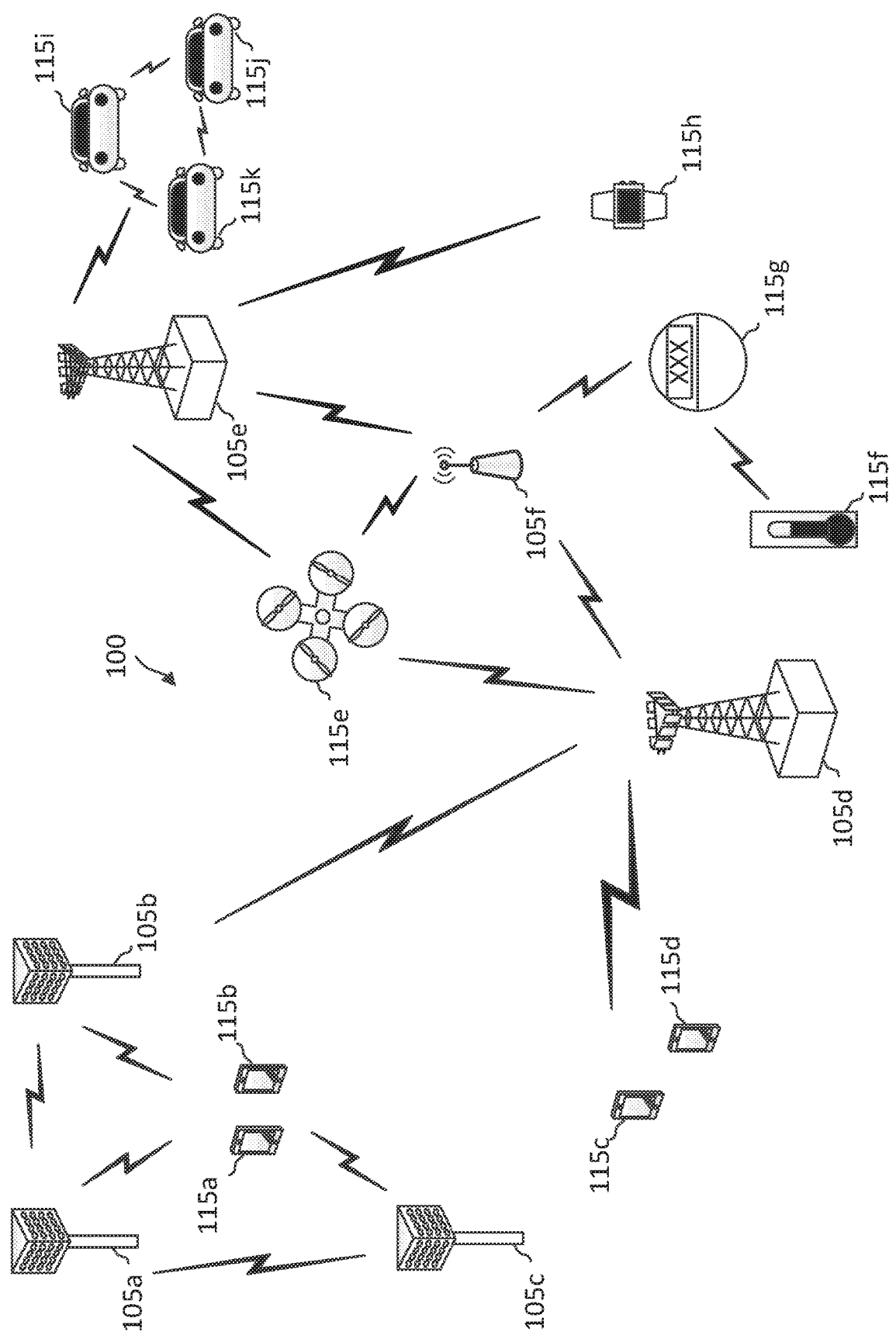
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for medium sharing with considerations for flexible scheduling. Flexible scheduling may refer to a scheduling timeline where a delay between a UL grant and a corresponding UL data transmission and/or a delay between a DL grant and a corresponding DL data reception may vary across different UEs, for example, based on the UEs' capabilities. For example, a BS may have gained access to a transmission opportunity (TXOP) in a spectrum based on a listen-before-talk (LBT) procedure. The BS may transmit a channel reservation signal to reserve the TXOP. The channel reservation signal may include a trigger for a UE. The triggered UE may respond by transmitting a channel reservation response signal to the BS when there is no transmission detected from a neighboring node. The BS may communicate with the triggered UE and/or other UEs during a first period before receiving a channel reservation response signal from the UE. In other words, the BS may utilize the spectrum while the triggered UE processes the channel reservation signal and prepare for the transmission of the channel reservation response signal instead of leaving the spectrum idle or unused. In addition, the BS may communicate with the triggered UE and/or other UEs during a second period after receiving the channel reservation response signal, but before completing the processing of the received channel reservation response signal. In other words, the BS may utilize the spectrum while the BS processes the received channel reservation response signal instead of leaving the spectrum idle or unused. Further, the BS may configure the duration of the first period based on a UE's capability. Accordingly, the present disclosure can improve spectrum utilization and/or sharing efficiency and provision for flexible scheduling.

In an embodiment, the BS may schedule the communications before receiving the channel reservation response signal and/or before processing the channel reservation response signal conservatively. For example, the BS may select a lower modulation order and/or a lower code rate to allow for a greater signal-to-interference-plus noise ratio (SINR) margin for the communications.

In an embodiment, the BS may select UEs that are less likely to experience hidden node interference for communications before receiving the channel reservation response signal and/or before processing the channel reservation response signal. For example, the BS may select the UEs based on a history of measurements collected from the UEs. The disclose embodiments are suitable for use in asynchronous spectrum sharing and coordinated synchronous spectrum sharing.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands, for example, at about 3.5 gigahertz (GHz), sub-6 GHz or higher frequencies in the mmWav band. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform an LBT in the shared channel. When the LBT passes, the BS 105 may schedule a UE 115 for communications over the shared channel during the TXOP.

Figure 2:
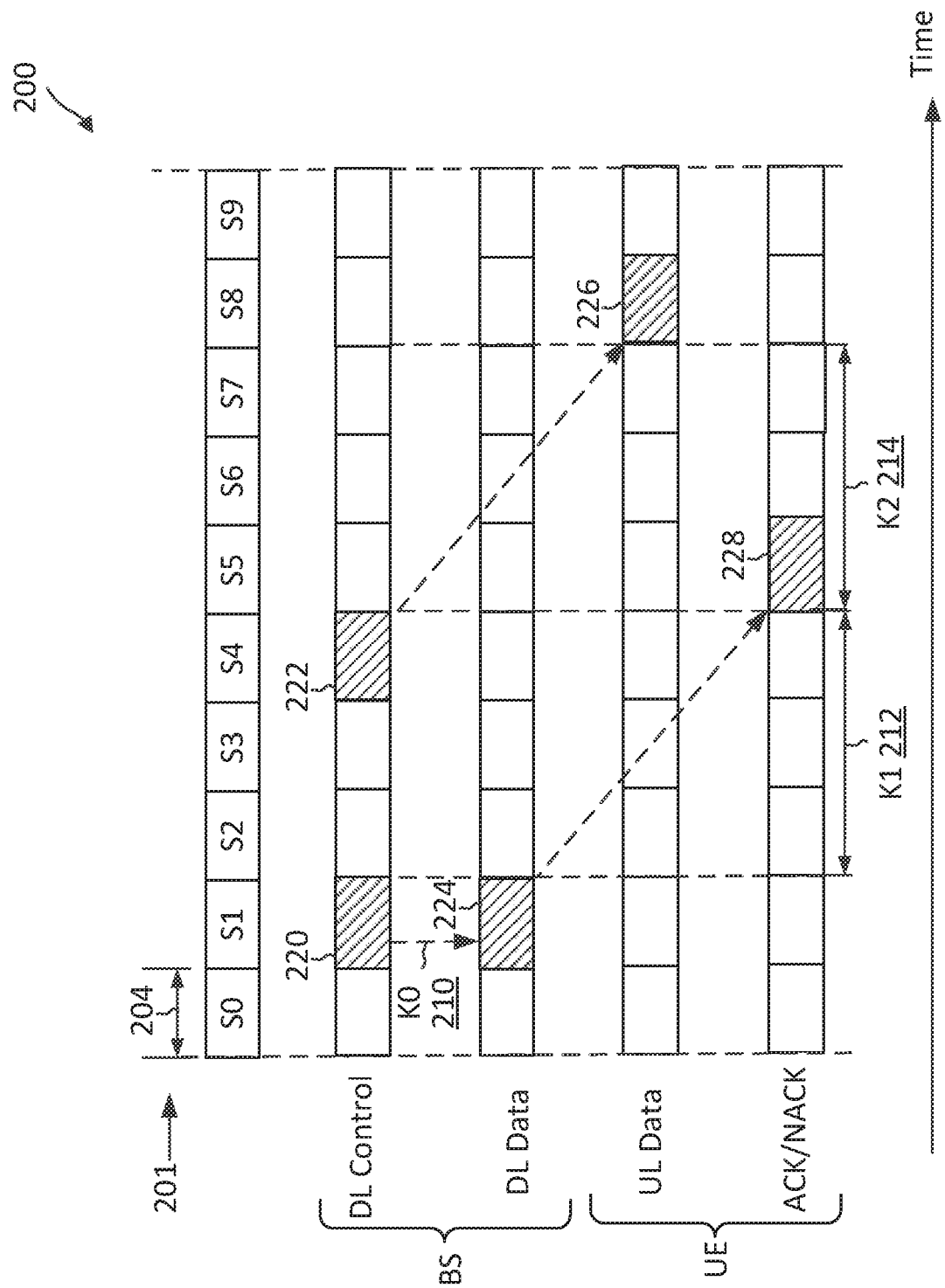
FIG. 2 illustrates a flexible scheduling timeline according to some embodiments of the present disclosure.

FIG. 2 illustrates a flexible scheduling timeline 200 according to some embodiments of the present disclosure. The scheduling timeline 200 may correspond to a scheduling timeline communicated between a BS 105 and a UE 115 of the network 100. In FIG. 2, the x-axis represents time in some constant units. FIG. 2 shows a frame structure 201 including a plurality of slots 204 in time. The slots 204 are indexed from S0 to S9. For example, a BS may communicate with a UE in units of slots 204. The slots 204 may also be referred to as transmission time intervals (TTIs). Each slot 204 or TTI carries a medium access control (MAC) layer transport block. Each slot 204 may include a number of symbols in time and a number of frequency tones in frequency. Each slot 204 may include a DL control portion followed by at least one of a subsequent DL data portion, UL data portion, and/or a UL control portion. In the context of LTE, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

The BS and the UE may communicate based on a parameter 210, denoted as K0, a parameter 212, denoted as K1, and a parameter 214, denoted as K2. The parameter 210 indicates a delay between a DL grant and a corresponding DL transmission (e.g., a PDSCH transmission). The parameter 212 indicates a delay between a DL data reception (e.g., a PDSCH reception) and a corresponding acknowledgement (ACK) or not-ACK (NACK) transmission. The parameter 214 indicates a delay between a UL grant and a corresponding UL data transmission (e.g., PUSCH transmission). The parameters 210, 212, and 214 may be configured by the network and may be indicated in units of slots 204.

For example, in NR, the parameters 210, 212, and 214 may be indicated in downlink control information (DCI) carried in a PDCCH. The list of possible values for the parameter 210, K0, that can be configured by RRC is {0, 1, 2, 3, 4, 5, 8, 10, 16, 20, 32}. The list of possible values for the parameter 212, K1, that can be configured by RRC is {0, 1, 2, 3, 4, 5, 6, 7, 8}. The list of possible values for the parameter 213, K2, that can be configured by RRC is {0, 1, 2, 3, 4, 5, 6, 7, 8, 10, 16, 20, and 32}.

As an example, the parameter 210 may indicate a value 0 (e.g., K0=0), the parameter 212 may indicate a value of 4 (e.g., K1=4), and the parameter 214 may indicate a value of 4 (e.g., K2=4). The pattern-filled boxes represent transmissions of DL control information, DL data, UL data, an ACK, and/or an NACK in corresponding slots 204. While an entire slot 204 is pattern-filled, a transmission may occur in a corresponding portion of the slot 204. As shown, the BS transmits DL control information 220 in the slot 204 indexed S1 (e.g., in a DL control portion of the slot 204). The DL control information 220 may indicate a DL grant for the UE in the same slot 204 indexed S1 (e.g., K0=0). Thus, the BS transmits a DL data signal 224 to the UE in the slot 204 indexed S1 (e.g., in a DL data portion of the slot 204). The UE may receive the DL control information 220 and receive the DL data signal 224 based on the DL grant.

After receiving the DL data signal 224, the UE 115 may report a reception status of the DL data signal 224 to the BS by transmitting an ACK/NACK signal 228 in the slot 204 indexed S5 (e.g., in a UL data portion or a UL control portion of the slot 204) based on the parameter 212 (e.g., K1=4). The slot 204 indexed S5 is a fourth slot from the slot 204 indexed S1. The ACK/NACK signal 228 refers to a feedback signal carrying an ACK or an NACK. The UE may transmit an ACK when the reception of the DL data signal 224 is successful. Alternatively, the UE may transmit an NACK when the reception of the DL data signal 224 is unsuccessful (e.g., including an error or failing an error correction).

The BS further transmits DL control information 222 in the slot 204 indexed S4 (e.g., in a DL control portion of the slot 204). The DL control information 222 may indicate a UL grant for the UE. The UE transmits a UL data signal 226 to the BS in the slot 204 indexed S8 (e.g., in a UL data portion of the slot 204) based on the UL assignment and the parameter 214 (e.g., K2=4). The slot 204 indexed S8 is a fourth slot from the slot 204 indexed S4.

Figure 3:
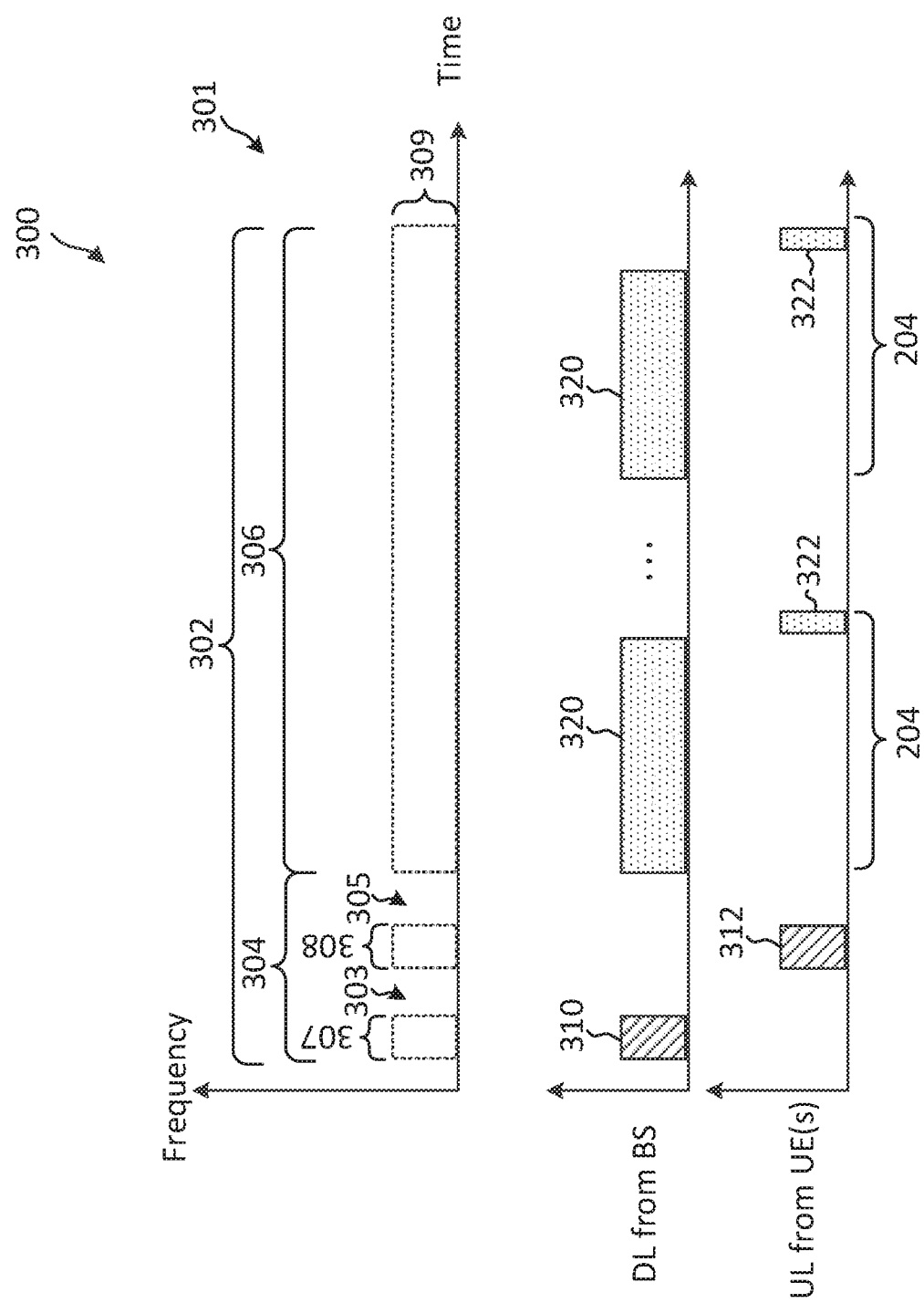
FIG. 3 illustrates spectrum sharing scheme according to some embodiments of the present disclosure.

FIG. 3 illustrates spectrum sharing scheme 300 according to some embodiments of the present disclosure. The scheme 300 may be employed by the BSs 105 and UEs 115 of the network 100. The scheme 300 can be used in conjunction with the flexible scheduling timeline 200. In FIG. 3, the x-axes represent time in some constant units and the y-axes represent frequency in some constant units. The scheme 300 employs TXOPs 302 with a structure 301 for sharing a spectrum 309, which may be an unlicensed spectrum. Each TXOP 302 includes a preparation period 304 and a data transmission period 306. The preparation period 304 includes a reservation period 307 and a response period 308. The data transmission period 306 may include a plurality of slots 204.

A BS contending for a TXOP 302 in the spectrum 309 may perform an LBT (e.g., based on energy detection and/or signal detection). Upon a successful LBT, the BS transmits a channel reservation signal 310 during the reservation period 307. The channel reservation signal 310 may include a preamble, a reservation duration, and/or a trigger for one or more UE(s) served by the BS. A triggered UE may also perform medium sensing in the spectrum 309. When no transmission is detected, the triggered UE may respond to the channel reservation signal 310 by transmitting a channel reservation response signal 312 during the response period 308. The channel reservation signal 310 and the channel reservation response signal 312 may also be referred to as request-to-send (RTS) and clear-to-send (CTS), respectively. In some instances, the BS may also transmit a CSI-RS during the preparation period 304 to facilitate measurements at the triggered UEs.

Subsequently, the BS may communicate DL communication signals 320 and UL communication signals 322 with the one or more triggered UEs during data transmission period 306. The DL communication signals 320 may include a PDCCH signal, a PDSCH signal, and/or a PBCH signal. The UL communication signals 322 may include a PUCCH signal and/or a PUSCH signal. The channel reservation signal 310 may silence nodes in proximity of the BS, while the channel reservation response signal 312 may silence nodes in proximity of a triggered UE. While FIG. 3 illustrates the slots 204 in the data transmission period 306 as DL-centric slots, the data transmission period 306 can include DL-centric slots 204, UL-centric slots 204, and/or any combinations of UL and DL communications.

The reservation period 307 and the response period 308 are separated by a gap period 303. The response period 308 and the data transmission period 306 are separated by a gap period 305. The gap periods 303 and 305 allows for UL-DL switching. For example, the gap period 303 allows the UE to process the channel reservation signal 310 and to prepare for the transmission of the channel reservation response signal 312. In some wireless communication technology, such as WiFi, the gap periods 303 and 305 may be restricted to be about 16 microseconds ($\mu$s). When the gap periods 303 and 305 are short, the overhead associated with the channel reservation and response may be insignificant. However, such a timing requirement may mandate all nodes (e.g., UEs) to have a fast turn-around time for receive processing and transmit preparation.

When applying the scheme 300 for NR, the turn-around time (e.g., the gap period 303) may be similar to the time period specified by the parameter 212, K1, and/or the parameter 214, K2, in the scheduling timeline 200 described above with respect to FIG. 2. Depending on the SCS used for the transmissions of the channel reservation signal 310 and the channel reservation response signal 312, the gap period 303 may be relatively long. For example, for a 60 kHz SCS, the gap period 303 (e.g., K1 and K2) may be about two slots 204 long based on NR specification. In addition, capabilities among UEs may vary, where some UEs may require a longer processing time than others. As such, the reservation overhead (e.g., the preparation period 304) can be significant.

The present disclosure provides techniques to reduce the reservation overhead in spectrum sharing by utilizing the gap periods 303 and 305 for transmissions instead of idling. Accordingly, spectrum sharing and/or spectrum utilization efficiency can be improved.

Figure 4:
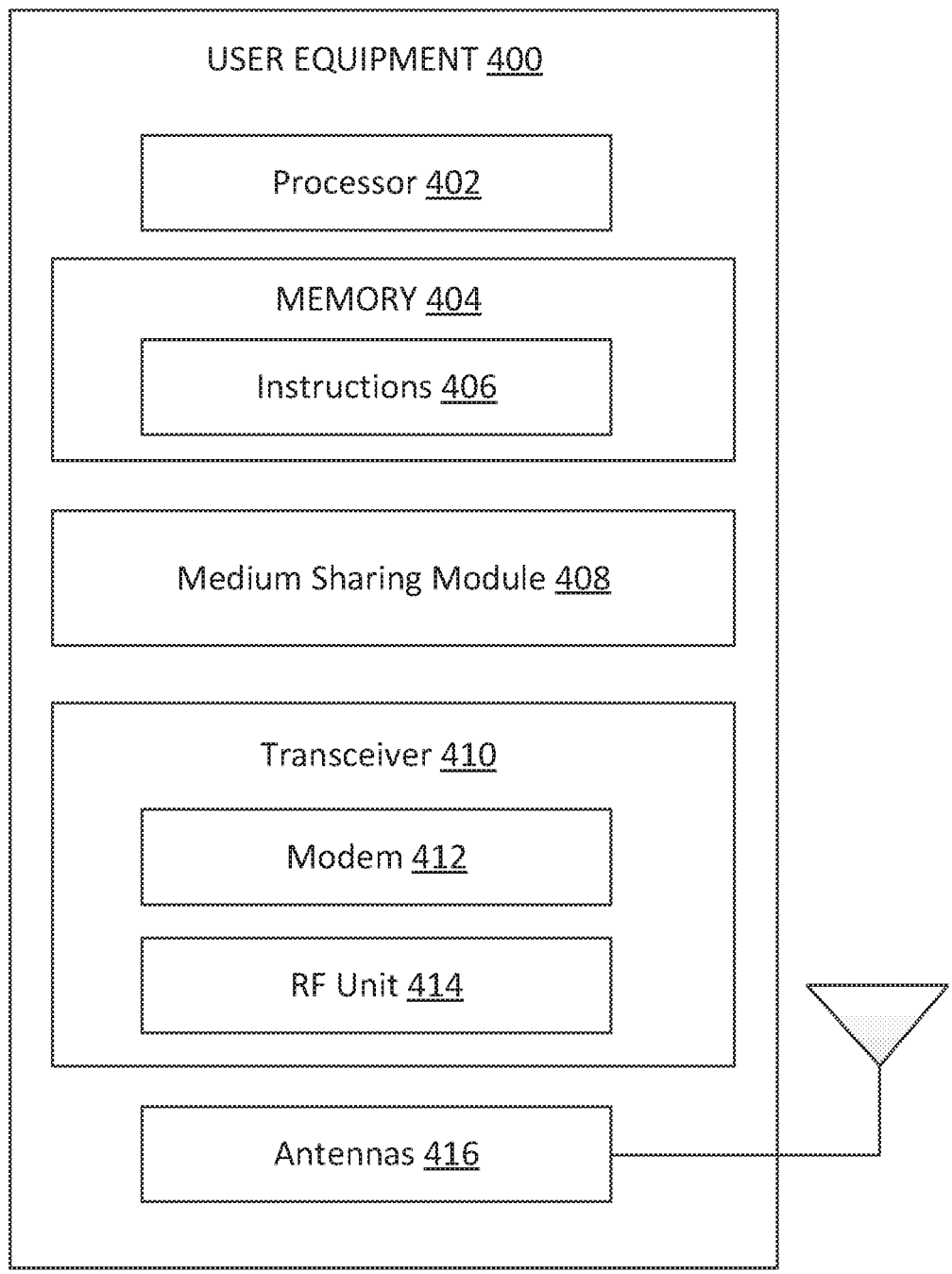
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 as discussed above in FIG. 1. As shown, the UE 400 may include a processor 402, a memory 404, a medium sharing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIGS. 6-9. Instructions 406 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The medium sharing module 408 may be implemented via hardware, software, or combinations thereof. For example, the medium sharing module 408 may be implemented as a processor, circuit, and/or instructions 406 stored in the memory 404 and executed by the processor 402. The medium sharing module 408 may be used for various aspects of the present disclosure, for example, aspects of FIGS. 6-9. For example, the medium sharing module 408 is configured to report capabilities (e.g., for processing associated with the K0, K1, and K2 parameters) to a serving BS (e.g., the BSs 105), monitor for channel reservations and/or schedules (e.g., carried in the channel reservation signals 310) from the serving BS, perform medium sensing (e.g., to listen for transmissions from other BSs and/or UEs), respond to channel reservations from the serving BS based on the medium sensing, and/or communicate with the serving BS based on schedules received from the serving BS.

In an embodiment, the channel reservation may include timing information for responding to the channel reservation. The timing information may include a relative time with respect to the channel reservation reception time. In such an embodiment, the medium sharing module 408 may be further configured to transmit a channel reservation response according to the timing information. In an embodiment, the medium sharing module 408 may be further configured to receive a schedule from the serving BS for a communication in a time period between the reception of a channel reservation and the transmission of a channel reservation response, where a reservation overhead may be reduced. In an embodiment, the medium sharing module 408 may be further configured to monitor for channel reservations from other BSs and may monitor for channel responses from other UEs based on timing information included in the channel reservations of the other BSs. Mechanisms for performing medium sharing with a reduced reservation overhead are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the medium sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
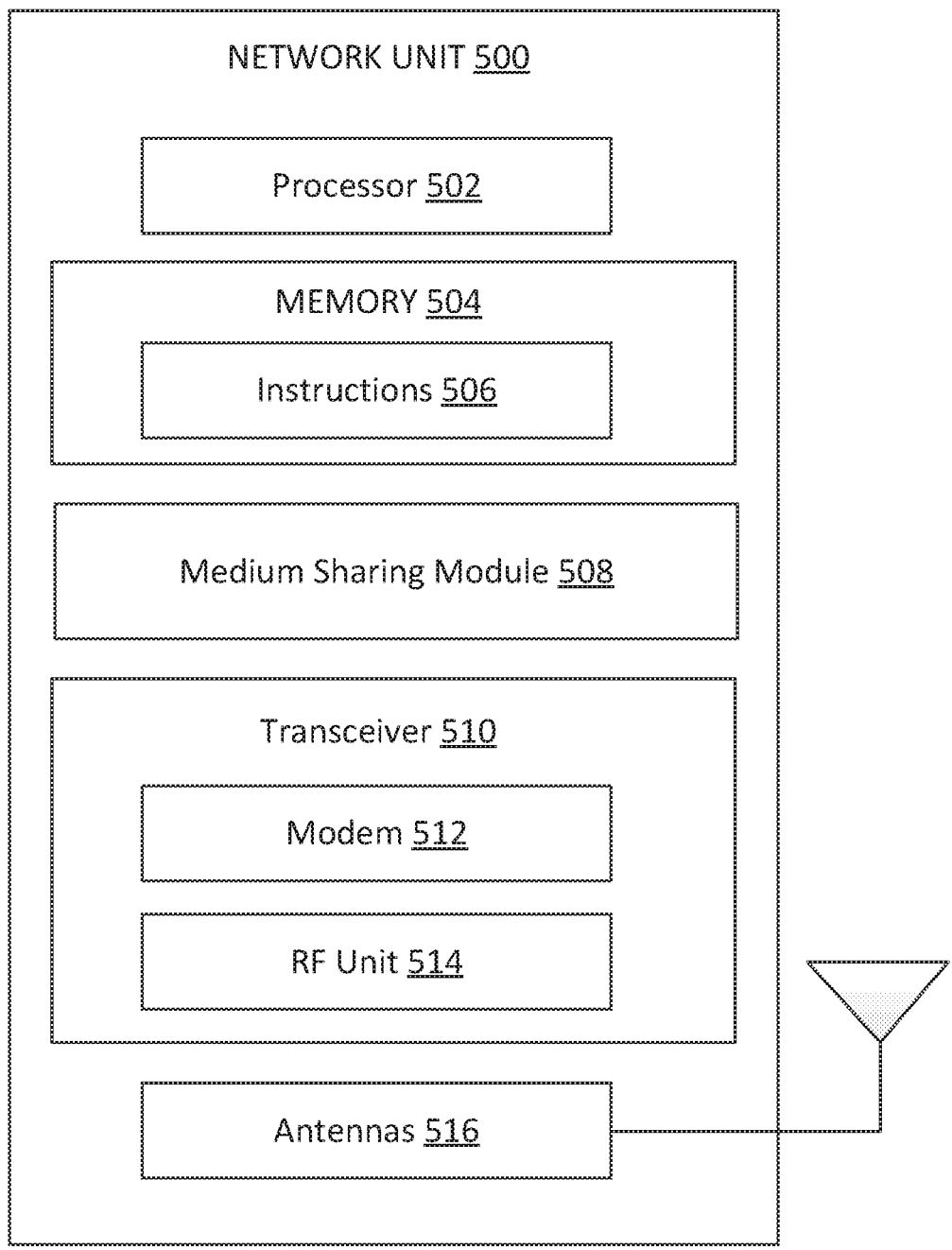
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 as discussed above in FIG. 1. As shown, the BS 500 may include a processor 502, a memory 504, a medium sharing module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-9. Instructions 506 may also be referred to as code, which may be interpreted broadly to include any type of computer-readable statement(s) as discussed above with respect to FIG. 4.

The medium sharing module 508 may be implemented via hardware, software, or combinations thereof. For example, the medium sharing module 508 may be implemented as a processor, circuit, and/or instructions 506 stored in the memory 504 and executed by the processor 502. The medium sharing module 508 may be used for various aspects of the present disclosure, for example, aspects of FIGS. 6-9. For example, the medium sharing module 508 is configured to perform an LBT to contend for a TXOP (e.g., the TXOP 302) in a spectrum (e.g., the spectrum 309), transmit a channel reservation for the TXOP upon a successful LBT, monitor for a channel response from a UE (e.g., the UEs 115 and 400), communicate with one or more UEs after transmitting the channel reservation and before receiving the channel response and/or before processing the received channel response to reduce a reservation overhead, performing an LBT after processing the channel reservation response, sharing the spectrum with another operator based on coordinated synchronized sharing, and/or sharing the spectrum with another operator based on asynchronized sharing. In an embodiment, the medium sharing module 508 may be further configured to receive UE's capabilities, determine a channel reservation response time for the UE based on the UE's capabilities, and/or include timing information associated with the channel reservation response time in a channel reservation. Mechanisms for performing medium sharing with a reduced reservation overhead are described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
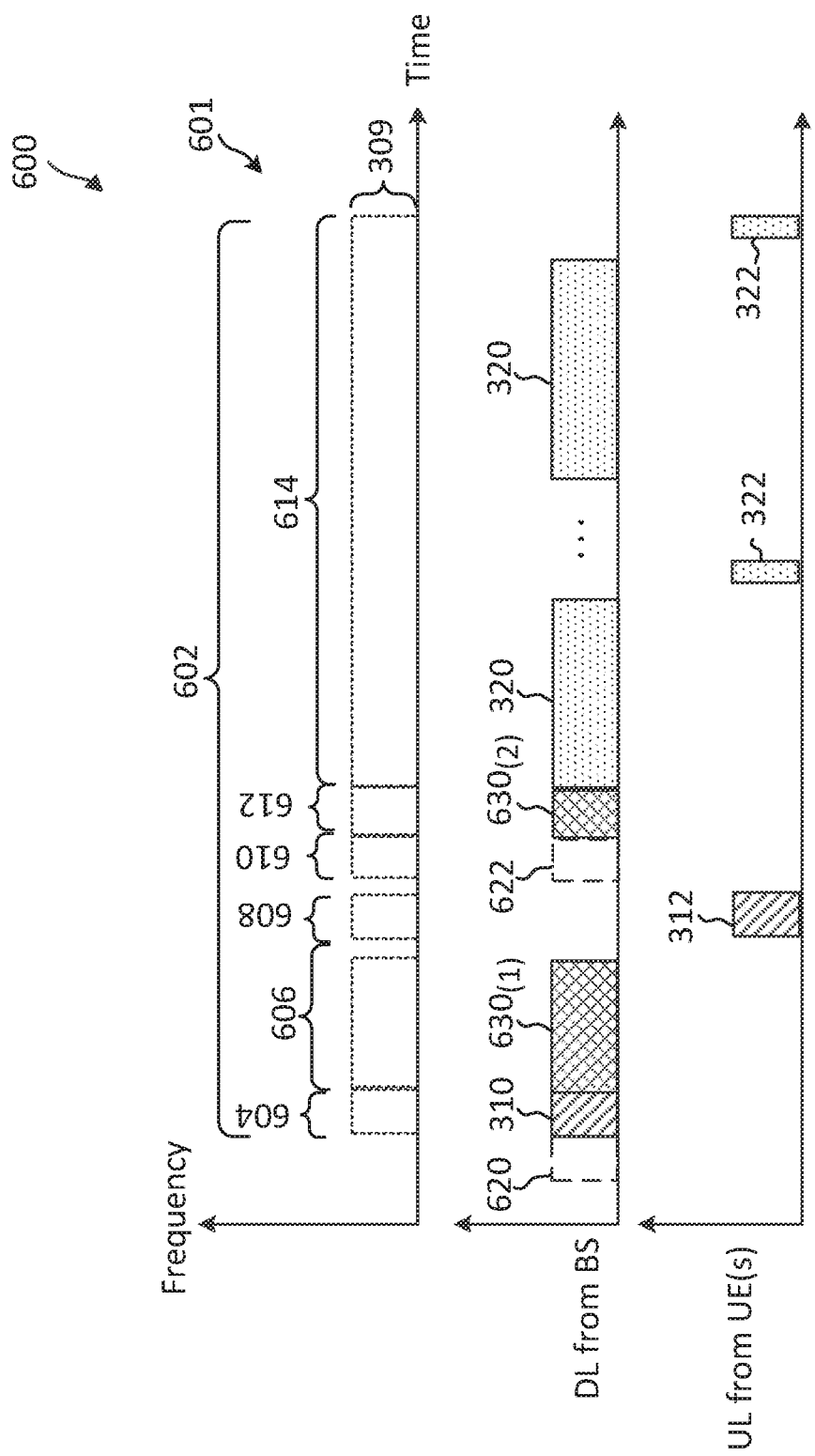
FIG. 6 illustrates a spectrum sharing scheme that provisions for flexible scheduling according to some embodiments of the present disclosure.
Figure 7:
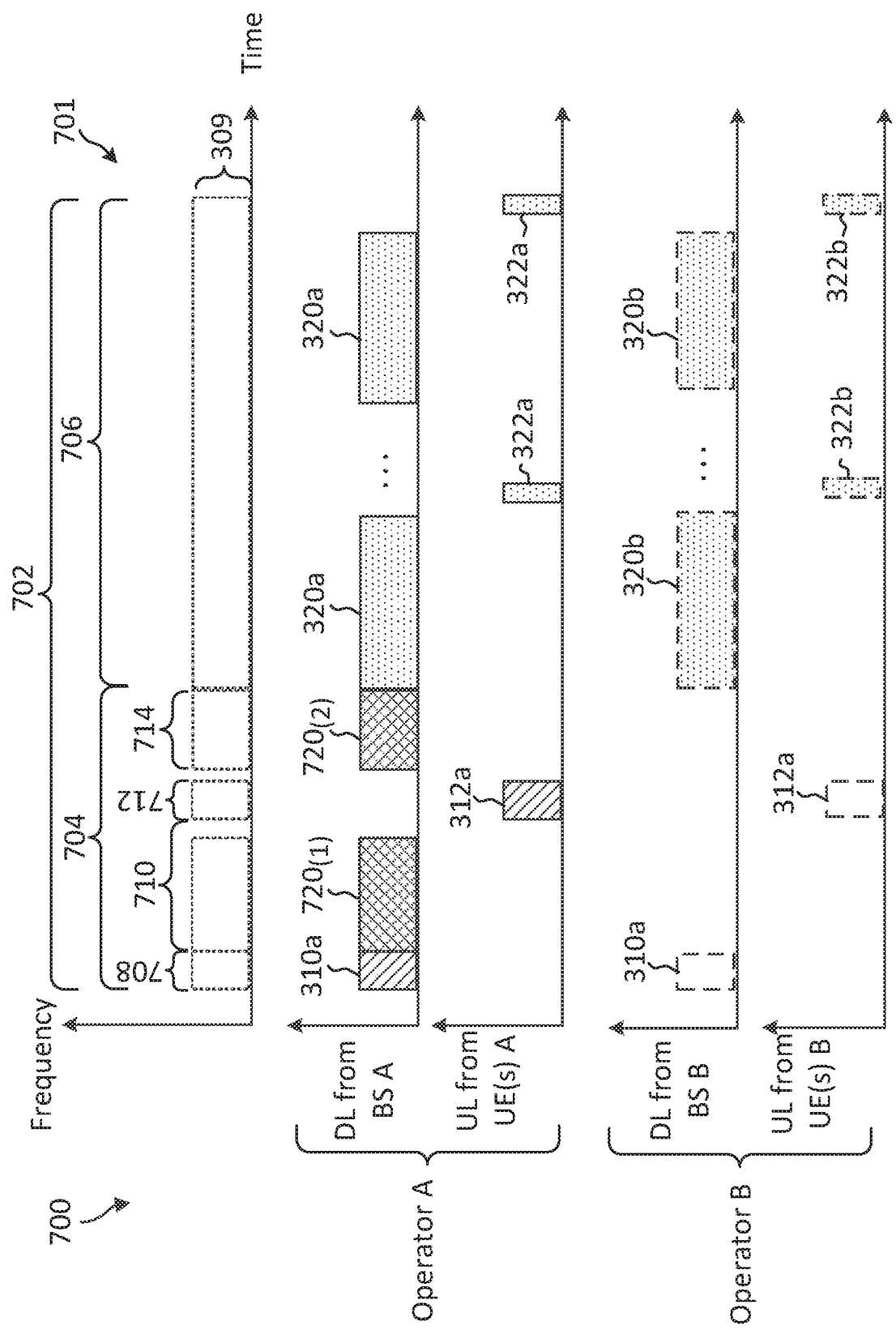
FIG. 7 illustrates a synchronized spectrum sharing scheme that provisions for flexible scheduling according to some embodiments of the present disclosure.
Figure 8:
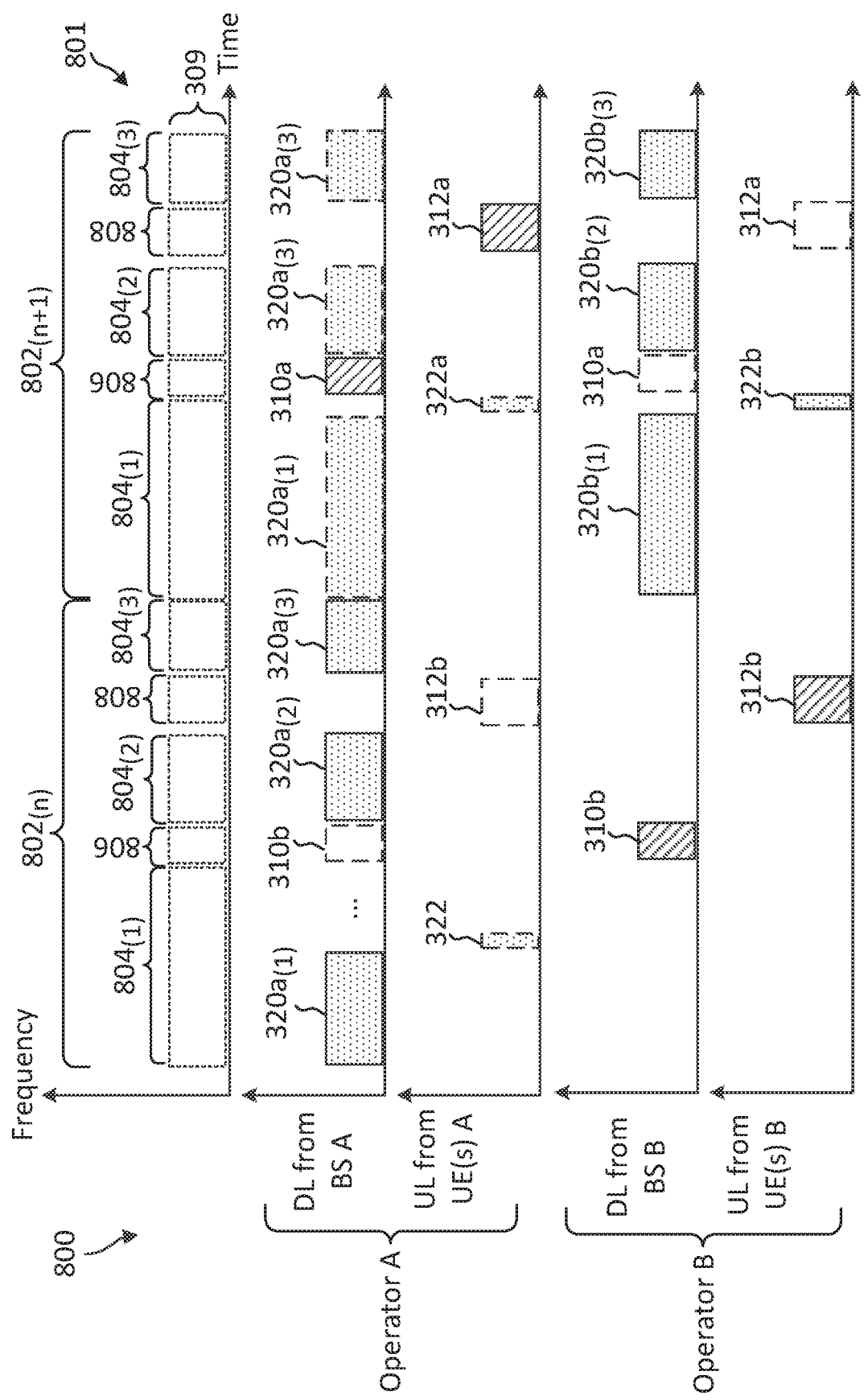
FIG. 8 illustrates a synchronized spectrum sharing scheme that provisions for flexible scheduling according to some embodiments of the present disclosure.

FIGS. 6-8 illustrate various mechanisms for sharing a communication medium using TXOP structures that can provision for flexible scheduling and reduce a reservation overhead. In FIGS. 6-8, the x-axes represent time in some constant units and the y-axes represent frequency in some constant units. The pattern-filled boxes with solid outlines represent signal transmissions. The pattern-filled boxes with dashed outlines represent potential opportunistic transmissions. The empty-filled boxes with dashed outlines represent LBT or medium sensing.

FIG. 6 illustrates a spectrum sharing scheme 600 that provisions for flexible scheduling according to some embodiments of the present disclosure. The scheme 600 may be employed by the BSs 105 and UEs 115 of the network 100. The scheme 600 employs TXOPs 602 with a structure 601 for sharing a spectrum 309. The scheme 600 is described using similar reservation and/or communication signals as in the scheme 300 and may use the same reference numerals as in FIG. 3 for simplicity sake. Each TXOP 602 includes a reservation period 604, a data transmission period 606, a response period 608, a LBT period 610, and data transmission periods 612, and 614 in order. As shown, the reservation period 604 and the response period 608 are separated by the data transmission period 606 instead of a gap period 303 as in the scheme 300.

In the scheme 600, a BS contending for a TXOP 602 in the spectrum 309 may perform an LBT 620 (e.g., based on energy detection and/or signal detection). Upon a successful LBT, the BS transmits a channel reservation signal 310 during the reservation period 604. The channel reservation signal 310 may include a preamble, CTS2self signal, a channel reservation, and/or a RTS to trigger one or more UEs to send a channel reservation response signal 312.

The BS may schedule one or more UEs for communications (e.g., communication signals $630_{(1)}$) during the data transmission period 606 before receiving the channel reservation response signal 312. In some instances, the scheduled UEs may include the triggered UEs. Since the BS may not have interference information about the triggered UEs, the BS may schedule the UEs conservatively (e.g., using a lower modulation order and/or a lower coding rate) for the communications of the communication signals $630_{(1)}$. Alternatively, the BS may schedule UEs that are not subjected to hidden node interference for the communications of the communication signals $630_{(1)}$, for example, based on long-term measurement history. As an example, the BS may receive signal strength indicator (RSSI) measurements from UEs over time and may determine the level of interference experienced by the UEs based on the RSSI measurements and the time periods when the RSSI measurements were collected. When a UE reports a high RSSI in a time period when the BS has no scheduled communication, the high RSSI can be an indication of interference experience by the UE. The DL communication signals 630 may include a PDCCH signal, a PDSCH signal, and/or a PBCH signal. While the communications in the data transmission periods 606 and 612 are shown as DL communication signals, in some embodiments, UL communication signals may be communicated in data transmission periods 606 and 612.

Upon detecting the channel reservation signal 310, a triggered UE transmits a channel reservation response signal 312 (e.g., a CTS) during the response period 608. The data transmission period 606 prior to the response period 608 allows time for the triggered UE to process the channel reservation signal 310 and to prepare for the transmission for the channel reservation response signal 312. In some embodiments, the data transmission period 606 can be predetermined or fixed. In some other embodiments, the data transmission period 606 can be variable, for example, including about 1, 2, 3, 4, 5, 6, 7, or 8 slots 204. The BS may include an indication in the channel reservation signal indicating a time when the triggered UE may respond to the channel reservation signal 310. The BS may indicate a delay parameter similar to the K1 parameter 212 or the K2 parameter 214 in units of slots (e.g., the slots 204) relative to the reception of the channel reservation signal 310. The BS may configure the delay parameter based on the capabilities of the triggered UE to provision for flexible scheduling. For a UE with a turn-around capability of 1 slot, the BS may indicate a delay parameter of 1 slot. Alternatively, for a UE with a turn-around capability of 2 slots, the BS may indicate a delay parameter of 2 slots. To provide a better delay granularity, the BS may indicate the delay parameter in units of symbols instead of slots.

After receiving the channel reservation response signal 312, the BS may schedule one or more UEs for communications (e.g., communication signals $630_{(2)}$) during the data transmission period 612 before completing the processing of the channel reservation response signal 312. The one or more UEs scheduled in the data transmission period 612 may be the same as the one or more UEs scheduled in the data transmission period 606 and may include the triggered UE. When the BS detects the channel reservation response signal 312, the BS may skip the LBT period 610 and extend the data transmission period 612 into the LBT period 610.

After processing the channel reservation response signal 312, the BS may schedule communications with the triggered UE more appropriately and efficiently (e.g., using a higher-order MCS) since the triggered UE may silence neighboring nodes of the UE. As shown, the BS may communicate DL communication signals 320 and UL communication signals 322 with the triggered UE and/or other UEs during the data transmission period 614.

Conversely, when the BS fails to detect a channel reservation response signal 312 from the triggered UE in the response period 608. The failed detection may be due to the UE detecting interference from a neighboring node or the UE failing to meet the timeline requirement for sending the channel reservation response signal 312. The BS may refrain from scheduling the triggered UE for communication and terminate the usage of the TXOP 602 before the end of the TXOP 602. Alternatively, the BS may perform an LBT 622 during the LBT period 610 after the response period 608 and continue to schedule other UEs for communications in the already reserved TXOP 602. The LBT 622 may be a category 2 LBT without a random-backoff, which may also be referred to as a one-shot LBT.

FIG. 7 illustrates a synchronized spectrum sharing scheme 700 that provisions for flexible scheduling according to some embodiments of the present disclosure. The scheme 700 may be employed by the BSs 105 and UEs 115 of the network 100. The scheme 700 is described using similar reservation and/or communication signals as in the scheme 300, and may use the same reference numerals as in FIG. 3 for simplicity sake. The scheme 700 is substantially similar to the scheme 600. For example, in the scheme 700, a data transmission may occur between a channel reservation and a channel reservation response to better utilize a spectrum. However, the scheme 700 uses coordinated synchronized sharing. The scheme 700 employs TXOPs 702 with a structure 701 for sharing a spectrum 309. Each TXOP 702 includes an exclusive period 704 and a shared period 706. The exclusive period 704 includes a reservation period 708, a data transmission period 710, a response period 712, and a data transmission period 714 in order. As shown, the reservation period 708 and the response period 712 are separated by the data transmission period 710 (e.g., the data transmission period 606).

For coordinated synchronized sharing, different network operating entities may be assigned with different priorities in different TOXPs 702. In some instances, the priorities of the network operating entities may rotate among different TXOPs 702 in a round-robin manner. The data transmission periods 710 and 714 in the exclusive period 704 may be designated for an exclusive use (e.g., guaranteed transmissions) by a highest-priority network operating entity of the TXOP 702. The shared period 706 may be shared among the different network operating entities based on traffic loads of the network operating entities. Operator nodes may perform a priority-based medium sensing to share access to the spectrum 309 during the shared period 706. A low-priority operator node may listen for a channel reservation in the reservation period 708 and/or the response period 712 from a high-priority node. The low-priority operator node may opportunistically access the spectrum 309 in the shared period 706 when no channel reservation is detected from a higher-priority operator node.

As an example, in the TXOP 702, Operator A may have priority over Operator B in accessing the spectrum 309. Thus, a BS A of Operator A may transmit a channel reservation signal 310a during the reservation period 708. The channel reservation signal 310a may trigger one or more UEs A of the Operator A for a channel reservation signal transmission. When a triggered UE A detects the channel reservation signal 310, the triggered UE A may transmit a channel reservation response signal 312 (e.g., a CTS) during the response period 712.

The BS A may transmit one or more communication signals $720_{(1)}$ during the data transmission period 606 before receiving a channel reservation response signal 312. The communication signals $720_{(1)}$ may be guaranteed (e.g., timing-critical) transmissions. Some examples of communication signals $720_{(1)}$ may include SSBs, RACH, RMSI, paging, and/or high-priority traffic.

After receiving the channel reservation response signal 312 and before processing the channel reservation response signal 312, the BS A may transmit other communication signals $720_{(2)}$ (e.g., guaranteed signals) during the data transmission period 714.

After processing the channel reservation response signal 312, the BS A may schedule the one or more triggered UEs A for communications (e.g., DL communication signals 320a and UL communication signals 322a) in the shared period 706.

Low-priority operator nodes (e.g., a BS B and a UE B of Operator B) may monitor for a channel reservation signal 310a and/or a channel reservation response signal 312a during the reservation period 708 and/or the response period 712, respectively, from a high priority operator nodes (e.g., the BS A and the UE A). The Operator B nodes may use the shared period 706 of the TXOP 702 opportunistically. For example, upon detecting the channel reservation signal 310a and/or a channel reservation response signal 312a, the Operator B nodes may refrain from accessing the spectrum 309 during the shared period 706. However, when the BS A does not use the shared period 706, the BS B may communicate (e.g., DL communication signals 320b and UL communication signals 322b) with one or more UEs B during the shared period 706.

Similar to the scheme 600, the data transmission period 710 prior to the response period 712 allows time for the triggered UE to process the channel reservation signal 310 and to prepare for the transmission for the channel reservation response signal 312. The data transmission period 710 can be predetermined or fixed, which may account for the UE with the worst or longest turn-around timing (e.g., reception processing time and transmission preparation time). Alternatively, the data transmission period 710 can be variable and the BS A may use similar mechanisms as in the scheme 600 to configure a delay parameter (e.g., a location of the response period 712 relative to the reservation period 708) based on UEs' capabilities. The BS A may indicate the delay parameter in the channel reservation signal 310. A low-priority operator nodes may monitor for the channel reservation response signal 312 based on the delay parameter. When a low-priority node cannot meet a turn-around time specified in the delay parameter, the low-priority node may yield its transmission in the shared period 706.

While the scheme 700 is illustrated with two operators in the sharing, the scheme 700 may be applied for sharing among three or more operators. In general, when the sharing is among N operators, the exclusive period 704 in the TXOP 702 may include (N−1) reservation periods 708 and (N−1) response periods 712, where N is a positive integer greater than 1. In addition, while the communications in the data transmission periods 710 and 714 are shown as DL communication signals, in some embodiments, UL communication signals may be communicated in data transmission period 710 and 714.

FIG. 8 illustrates a synchronized spectrum sharing scheme 800 that provisions for flexible scheduling according to some embodiments of the present disclosure. The scheme 800 may be employed by the BSs 105 and UEs 115 of the network 100 for coordinated synchronized sharing. The scheme 800 is described using similar reservation and/or communication signals as in the scheme 300, and may use the same reference numerals as in FIG. 3 for simplicity sake. The scheme 800 is substantially similar to the scheme 700. However, in the scheme 800, medium sensing signals (e.g., the channel reservation signal 310 and the channel reservation response signal 312) for a TXOP are transmitted in a previous TXOP instead of in an exclusive period of a TXOP as in the scheme 700. In other words, each TXOP includes exclusive resources for medium sensing signal transmission meant for a next TXOP. The scheme 800 employs a TXOP 802 with a structure 801 for sharing a spectrum 309. Each TXOP 802 includes data transmission periods 804 (shown as $804_{(1)}$, $804_{(2)}$, and $804_{(3)}$), a reservation period 806, and a response period 808. Similar to the scheme 700, different network operating entities may be assigned with different priorities in different TOXPs 802. A highest priority operator of a TXOP 802 may have priority access to the TXOP 802, while lower-priority operator may have opportunistic access to the TXOP 802.

The reservation period 806 and the response period 808 can be located towards the end of the TXOP 802 (e.g., in the last two to three slots of the TXOP 802). The reservation period 806 and the response period 808 are medium-sensing periods for a next TXOP 802. In other words, medium sensing performed in the reservation period 806 and the response period 808 of a current TXOP $802_{(n)}$ is for sharing a next TXOP $802_{(n+1)}$. Similar to the schemes 600 and 700, the reservation period 806 and the response period 808 are separated by the data transmission period $804_{(2)}$ (e.g., the data transmission periods 606 and 710) to allow time for a UE to process a received channel reservation signal 310 and prepare for a transmission of a channel reservation response signal 312. The data transmission period $804_{(3)}$ after the response period 808 allows time for a BS to process a received channel reservation response signal 312 and to prepare for a transmission of a DL control signal (e.g., a schedule for a UE). While the reservation period 806 and the response period 808 are shown to be in the last two to three slots of the TXOP 802, the reservation period 806 and the response period 808 can be located in any suitable slot within the TXOP 802 depending on the processing timeline.

As an example, Operator A may have priority over Operator B in the TXOP $802_{(n)}$, while Operator B may have priority over Operator A in the TXOP $802_{(n+1)}$. In the TXOP $802_{(n)}$, a BS A and one or more UEs A of Operator A may communicate DL communication signals 320 and UL communication signals 322 during the data transmission periods 804.

A BS B of Operator B having priority access in a next TXOP $802_{(n+1)}$ may transmit a channel reservation signal 310b in the reservation period 806 of the TXOP $802_{(n)}$ to reserve the next TXOP $802_{(n+1)}$. The channel reservation signal 310b may trigger one or more UEs B of Operator B for communications in the TXOP $802_{(n+1)}$. A triggered UE B may respond by transmitting a channel reservation response signal 312b in the response period 808 of the TXOP $802_{(n)}$. Subsequently, the BS A may communicate DL communication signals 320 and UL communication signals 322 with the triggered UE during the data transmission periods 804 of the next TXOP $802_{(n+1)}$.

The BS A and the UE A having a lower priority than Operator B in the next TXOP $802_{(n+1)}$ may monitor for a channel reservation signal 310b and/or a channel reservation response signal 312 from Operator B in the reservation period 806 and 808 of the TXOP $802_{(n)}$. Upon detecting a channel reservation signal 310b and/or a channel reservation response signal 312 from Operator B, the BS A may refrain from accessing the spectrum 309 in the next TXOP $802_{(n+1)}$. However, when no channel reservation signal 310b or channel reservation response signal 312 is detected, the BS A may opportunistically access the spectrum 309 as shown by the DL communication signals 320a and UL communication signals 322a in the next TXOP $802_{(n+1)}$.

Similarly in the TXOP $802_{(n+1)}$, the BS B and the UEs B may monitor for a channel reservation signal 310 and/or a channel reservation response signal during the reservation period 806 and the response period 808 of the TXOP $802_{(n+1)}$, respectively, from a higher priority operator (e.g., Operator A) of a next TXOP $802_{(n+1)}$ (not shown).

Similar to the schemes 600 and 700, the data transmission period $804_{(2)}$ prior to the response period 808 allows time for the triggered UE to process the channel reservation signal 310 and to prepare for the transmission for the channel reservation response signal 312. The data transmission period $804_{(2)}$ can be predetermined or fixed, which may account for the UE with the worst or longest turn-around timing (e.g., reception processing time and transmission preparation time). Alternatively, the data transmission period $804_{(2)}$ can be variable and the BS A may use similar mechanisms as in the schemes 600 and 700 to configure a delay parameter (e.g., a location of the response period 808 relative to the reservation period 806) based on UEs' capabilities. The BS A may indicate the delay parameter in the channel reservation signal 310.

While the scheme 800 is illustrated with two operators in the sharing, the scheme 800 may be applied for spectrum sharing among three or more operators. In general, when the sharing is among N operators, each TXOP 802 may include (N−1) reservation periods 806 and (N−1) response periods 808, where N is a positive integer greater than 1. In addition, while the communications in the data transmission period $804_{(2)}$ and $804_{(3)}$ are shown as DL communication signals, in some embodiments, UL communication signals may be communicated in data transmission period $804_{(2)}$ and $804_{(3)}$.

As can be seen from the schemes 600, 700, and 800, a data transmission (e.g., the communication signals $630_{(1)}$, $720_{(1)}$, $320a_{(2)}$, and $320b_{(2)}$) may occur between a reservation period (e.g., the reservation periods 604, 708, and 806) and a response period (e.g., the response periods 608, 712, and 808) instead of leaving the spectrum unused while a UE (e.g., the UEs 115 and/or 400) processes a received channel reservation signal (e.g., the channel reservation signal 310) and prepares for a transmission of a channel reservation response signal (e.g., the channel reservation response signal 312). In addition, a data transmission (e.g., the communication signals $630_{(2)}$, $720_{(2)}$, $320a_{(3)}$, and $320b_{(3)}$) may be occur based on previous interference information after a response period instead of leaving the spectrum unused while the BS processes a received channel reservation signal and prepares for a new communication schedule with a UE based on new interference information from the received channel response signal. Accordingly, the present disclosure can reduce reservation overheads and improve spectrum sharing and utilization efficiency.

Further, the data transmission period between a reservation period and a response period may be configured based on a UE's capabilities. For example, a UE may report its capabilities (e.g., delays associated with the K1 parameter 212 and the K2 parameter 214) to a serving BS and the serving BS may configure a time location for a response period corresponding to a reservation period based on the UE's reported capabilities.

Figure 9:
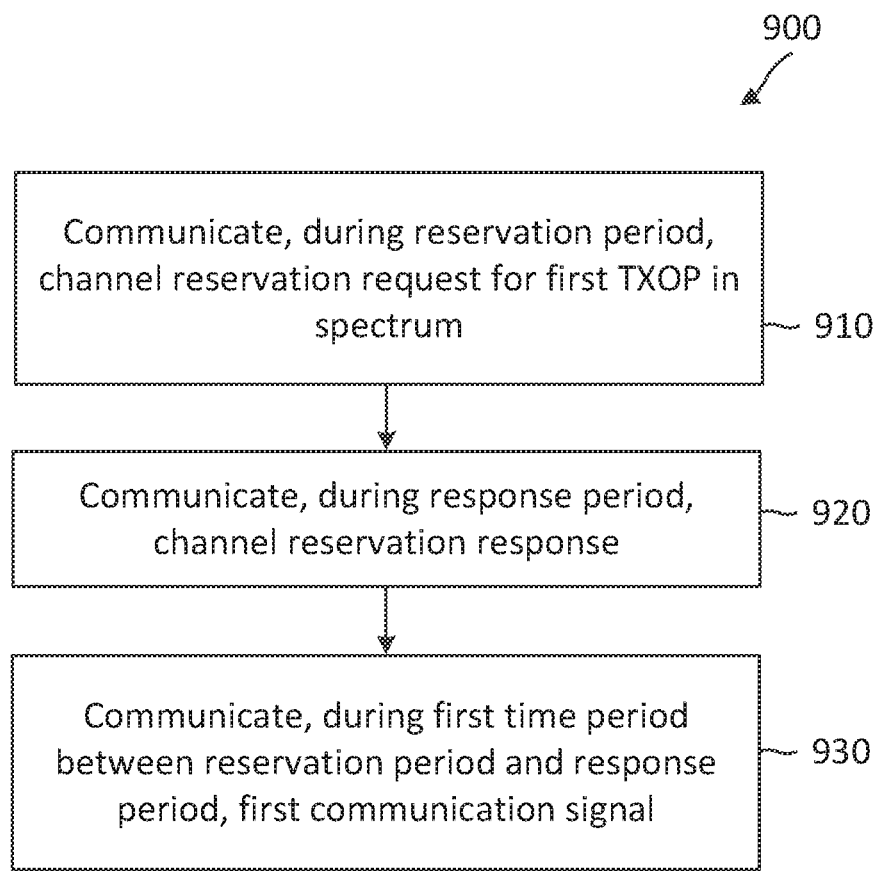
FIG. 9 is a flow diagram of a medium sharing method according to some embodiments of the present disclosure.

FIG. 9 is a flow diagram of a medium sharing method 900 according to some embodiments of the present disclosure. Steps of the method 900 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the medium sharing module 408, the transceiver 410, and the one or more antennas 416, to execute the steps of method 900. In another example, a wireless communication device, such as the BS 105 or BS 500, may utilize one or more components, such as the processor 502, the memory 504, the medium sharing module 508, the transceiver 510, and the one or more antennas 516, to execute the steps of method 900. The method 900 may employ similar mechanisms as in the schemes 600, 700, and 800 described above with respect to FIGS. 6, 7, and 8, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes communicating, by a first wireless communication device with a second wireless communication device during a reservation period (e.g., the reservation periods 604, 708, and 806), a channel reservation request (e.g., the channel reservation signals 310) for a first TXOP (e.g., the TXOPs 602, 702, and 80) in a spectrum (e.g., the spectrum 309).

At step 920, the method 900 includes communicating, by a first wireless communication device with the second wireless communication device during a response period (e.g., the response periods 608, 712, and 808) in response to the channel reservation request, a channel reservation response (e.g., the channel reservation response signal 312).

At step 930, the method 900 includes communicating, by the first wireless communication device with a third wireless communication device during a first time period (e.g., the data transmission periods 606, 710, 804$_{(2)}$) between the reservation period and the response period, a first communication signal (e.g., the communication signals 630$_{(1)}$, 720$_{(1)}$, 320a$_{(2)}$, and 320b$_{(2)}$).

In an embodiment, the first wireless communication device may correspond to a BS (e.g., the BSs 105) and the second and third wireless communication devices may correspond to the same UE (e.g., the UEs 115) or different UEs served by the BS. In another embodiment, the first wireless communication device may correspond to a UE and the second and third wireless communication devices may correspond to the same BS serving the UE.

In an embodiment, the reservation period, the first time period, and the response period are within the first TXOP. The first wireless communication device may further communicate with a fourth wireless communication device during a second time period (e.g., the data transmission periods 612, 714, 804$_{(3)}$) after the response period, a second communication signal based on a schedule determined independent of the channel reservation response. In an embodiment, the first wireless communication device may further perform, during a third time period (e.g., the LBT period 610) between the response period and the second time period, an LBT (e.g., the LBT 622) in the spectrum.

In an embodiment, the first TXOP includes an exclusive period (e.g., the exclusive period 704) designated to a first network operator and a shared period (e.g., the shared period 706) for sharing among a plurality of network operators including the first network operator, wherein the reservation period, the first time period, the second time period, and the response period are within the exclusive period of the first TXOP.

In an embodiment, the reservation period, the first time period, and the response period are within a second TXOP (e.g., the TXOP 802$_{(n)}$) before the first TXOP (e.g., the TXOP 802$_{(n+1)}$). In an embodiment, the first wireless communication device may be associated with a first network operator and a second network operator may have a higher priority than the first network operator in a third TXOP after the first TXOP. The first wireless communication device may monitor, during the first TXOP, for at least one of a channel reservation request for the third TXOP or a channel reservation response for the third TXOP from the second network operator.

In an embodiment, the reservation period and the response period may be spaced apart by a predetermined time period. In an embodiment, the channel reservation request includes timing information associated with the response period. In an embodiment, the timing information may be based on a capability of the first wireless communication device or the second wireless communication device.

In an embodiment, the first wireless communication device may detect a channel reservation request for a second TXOP. The channel reservation request may include timing information associated with a response monitoring period for the second TXOP. The first wireless communication device may monitor, during the response monitoring period, for a channel reservation response for the second TXOP.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device during a reservation period, a channel reservation request for a first transmission opportunity (TXOP) in a spectrum; communicating, by the first wireless communication device with the second wireless communication device during a response period in response to the channel reservation request, a channel reservation response; and communicating, by the first wireless communication device with a third wireless communication device during a first time period between the reservation period and the response period, a first communication signal.

In some embodiments, wherein the reservation period, the first time period, and the response period are within the first TXOP. In some embodiments, the method further comprises communicating, by the first wireless communication device with a fourth wireless communication device during a second time period after the response period, a second communication signal based on a schedule determined independent of the channel reservation response. In some embodiments, the method further comprises performing, by the first wireless communication device during a third time period between the response period and the second time period, a listen-before-talk (LBT) in the spectrum. In some embodiments, wherein the first TXOP includes a period designated to a first network operator and a period for sharing among a plurality of network operators including the first network operator, wherein the reservation period, the first time period, the second time period, and the response period are within the period designated to the first network operator. In some embodiments, wherein the reservation period, the first time period, and the response period are within a second TXOP before the first TXOP. In some embodiments, wherein the first wireless communication device is associated with a first network operator, wherein a second network operator has a higher priority than the first network operator in a third TXOP after the first TXOP, and wherein the method further comprises monitoring, by the first wireless communication device during the first TXOP, for at least one of a channel reservation request for the third TXOP or a channel reservation response for the third TXOP from the second network operator. In some embodiments, wherein the reservation period and the response period are spaced apart by a predetermined time period. In some embodiments, wherein the channel reservation request includes timing information associated with the response period. In some embodiments, wherein the timing information is based on a capability of the first wireless communication device or the second wireless communication device. In some embodiments, the method further comprises detecting, by the first wireless communication device, a channel reservation request for a second TXOP, the channel reservation request including timing information associated with a response monitoring period for the second TXOP; and monitoring, by the first wireless communication device during the response monitoring period, for a channel reservation response for the second TXOP. In some embodiments, wherein the first wireless communication device is a base station, and wherein the second wireless communication device and the third wireless communication device correspond to different user equipment devices. In some embodiments, wherein the first wireless communication device is a base station, and wherein the second wireless communication device and the third wireless communication device correspond to a same user equipment device. In some embodiments, wherein the first wireless communication device is a user equipment device, and wherein the second wireless communication device and the third wireless communication device correspond to a same base station.

Further embodiments of the present disclosure include an apparatus comprising a transceiver configured to communicate, with a first wireless communication device during a reservation period, a channel reservation request for a first transmission opportunity (TXOP) in a spectrum; communicate, with the first wireless communication device during a response period in response to the channel reservation request, a channel reservation response; and communicate, with a second wireless communication device during a first time period between the reservation period and the response period, a first communication signal.

In some embodiments, wherein the reservation period, the first time period, and the response period are within the first TXOP. In some embodiments, wherein the transceiver is further configured to communicate, with a third wireless communication device during a second time period after the response period, a second communication signal based on a schedule determined independent of the channel reservation response. In some embodiments, the apparatus further comprises a processor configured to perform, during a third time period between the response period and the second time period, a listen-before-talk (LBT) in the spectrum. In some embodiments, wherein the first TXOP includes a period designated to a first network operator and a period for sharing among a plurality of network operators including the first network operator, wherein the reservation period, the first time period, the second time period, and the response period are within the period designated to the first network operator. In some embodiments, wherein the reservation period, the first time period, and the response period are within a second TXOP before the first TXOP. In some embodiments, wherein the apparatus is associated with a first network operator, wherein a second network operator has a higher priority than the first network operator in a third TXOP after the first TXOP, and wherein the apparatus further comprises a processor configured to monitor, during the first TXOP, for at least one of a channel reservation request for the third TXOP or a channel reservation response for the third TXOP from the second network operator. In some embodiments, wherein the reservation period and the response period are spaced apart by a predetermined time period. In some embodiments, wherein the channel reservation request includes timing information associated with the response period. In some embodiments, wherein the timing information is based on a capability of the first wireless communication device or the first wireless communication device. In some embodiments, the apparatus further comprises a processor configured to detect a channel reservation request for a second TXOP, the channel reservation request including timing information associated with a response monitoring period for the second TXOP; and monitor, during the response monitoring period, for a channel reservation response for the second TXOP. In some embodiments, wherein the apparatus is a base station, and wherein the first wireless communication device and the second wireless communication device correspond to different user equipment devices. In some embodiments, wherein the apparatus is a base station, and wherein the first wireless communication device and the second wireless communication device correspond to a same user equipment device. In some embodiments, wherein the apparatus is a user equipment device, and wherein the first wireless communication device and the second wireless communication device correspond to a same base station.

Further embodiments of the present disclosure include a computer-readable medium having program code recorded thereon, the program code comprising code for causing a first wireless communication device to communicate, with a second wireless communication device during a reservation period, a channel reservation request for a first transmission opportunity (TXOP) in a spectrum; code for causing the first wireless communication device to communicate, with the second wireless communication device during a response period in response to the channel reservation request, a channel reservation response; and code for causing the first wireless communication device to communicate, with a third wireless communication device during a first time period between the reservation period and the response period, a first communication signal.

In some embodiments, wherein the reservation period, the first time period, and the response period are within the first TXOP. In some embodiments, the computer-readable medium further comprises code for causing the first wireless communication device to communicate, with a fourth wireless communication device during a second time period after the response period, a second communication signal based on a schedule determined independent of the channel reservation response. In some embodiments, the computer-readable medium further comprises code for causing the first wireless communication device to perform, during a third time period between the response period and the second time period, a listen-before-talk (LBT) in the spectrum. In some embodiments, wherein the first TXOP includes a period designated to a first network operator and a period for sharing among a plurality of network operators including the first network operator, wherein the reservation period, the first time period, the second time period, and the response period are within the period designated to the first network operator. In some embodiments, wherein the reservation period, the first time period, and the response period are within a second TXOP before the first TXOP. In some embodiments, wherein the first wireless communication device is associated with a first network operator, wherein a second network operator has a higher priority than the first network operator in a third TXOP after the first TXOP, and wherein the computer-readable medium further comprises code for causing the first wireless communication device to monitor, during the first TXOP, for at least one of a channel reservation request for the third TXOP or a channel reservation response for the third TXOP from the second network operator. In some embodiments, wherein the reservation period and the response period are spaced apart by a predetermined time period. In some embodiments, wherein the channel reservation request includes timing information associated with the response period. In some embodiments, wherein the timing information is based on a capability of the first wireless communication device or the second wireless communication device. In some embodiments, the computer-readable medium further comprises code for causing the first wireless communication device to detect a channel reservation request for a second TXOP, the channel reservation request including timing information associated with a response monitoring period for the second TXOP; and code for causing the first wireless communication device to monitor, during the response monitoring period, for a channel reservation response for the second TXOP. In some embodiments, wherein the first wireless communication device is a base station, and wherein the second wireless communication device and the third wireless communication device correspond to different user equipment devices. In some embodiments, wherein the first wireless communication device is a base station, and wherein the second wireless communication device and the third wireless communication device correspond to a same user equipment device. In some embodiments, wherein the first wireless communication device is a user equipment device, and wherein the second wireless communication device and the third wireless communication device correspond to a same base station.

Further embodiments of the present disclosure include an apparatus comprising means for communicating, with a first wireless communication device during a reservation period, a channel reservation request for a first transmission opportunity (TXOP) in a spectrum; means for communicating, with the first wireless communication device during a response period in response to the channel reservation request, a channel reservation response; and means for communicating, with a second wireless communication device during a first time period between the reservation period and the response period, a first communication signal.

In some embodiments, wherein the reservation period, the first time period, and the response period are within the first TXOP. In some embodiments, the apparatus further comprises means for communicating, with a third wireless communication device during a second time period after the response period, a second communication signal based on a schedule determined independent of the channel reservation response. In some embodiments, the apparatus further comprises means for performing, during a third time period between the response period and the second time period, a listen-before-talk (LBT) in the spectrum. In some embodiments, wherein the first TXOP includes a period designated to a first network operator and a period for sharing among a plurality of network operators including the first network operator, wherein the reservation period, the first time period, the second time period, and the response period are within the period designated to the first network operator. In some embodiments, wherein the reservation period, the first time period, and the response period are within a second TXOP before the first TXOP. In some embodiments, wherein the first wireless communication device is associated with a first network operator, wherein a second network operator has a higher priority than the first network operator in a third TXOP after the first TXOP, and wherein the apparatus further comprises means for monitoring, during the first TXOP, for at least one of a channel reservation request for the third TXOP or a channel reservation response for the third TXOP from the second network operator. In some embodiments, wherein the reservation period and the response period are spaced apart by a predetermined time period. In some embodiments, wherein the channel reservation request includes timing information associated with the response period. In some embodiments, wherein the timing information is based on a capability of the first wireless communication device or the first wireless communication device. In some embodiments, the apparatus further comprises means for detecting a channel reservation request for a second TXOP, the channel reservation request including timing information associated with a response monitoring period for the second TXOP; and means for monitoring, during the response monitoring period, for a channel reservation response for the second TXOP. In some embodiments, wherein the first wireless communication device is a base station, and wherein the first wireless communication device and the second wireless communication device correspond to different user equipment devices. In some embodiments, wherein the first wireless communication device is a base station, and wherein the first wireless communication device and the second wireless communication device correspond to a same user equipment device. In some embodiments, wherein the first wireless communication device is a user equipment device, and wherein the first wireless communication device and the second wireless communication device correspond to a same base station.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device during a reservation period, a channel reservation request for a first transmission opportunity (TXOP) in a spectrum;
communicating, by the first wireless communication device with the second wireless communication device during a response period in response to the channel reservation request, a channel reservation response; and
communicating, by the first wireless communication device with a third wireless communication device during a first time period between the reservation period and the response period, a first communication signal different from the channel reservation request.

2. The method of claim 1, wherein the reservation period, the first time period, and the response period are within the first TXOP, and wherein the method further comprises:
communicating, by the first wireless communication device with a fourth wireless communication device during a second time period after the response period, a second communication signal based on a schedule determined independent of the channel reservation response.

3. The method of claim 2, further comprising:
performing, by the first wireless communication device during a third time period between the response period and the second time period, a listen-before-talk (LBT) in the spectrum.

4. The method of claim 2, wherein the first TXOP includes a period designated to a first network operator and a period for sharing among a plurality of network operators including the first network operator, wherein the reservation period, the first time period, the second time period, and the response period are within the period designated to the first network operator.

5. The method of claim 1, wherein the reservation period, the first time period, and the response period are within a second TXOP before the first TXOP.

6. The method of claim 5, wherein the first wireless communication device is associated with a first network operator, wherein a second network operator has a higher priority than the first network operator in a third TXOP after the first TXOP, and wherein the method further comprises:
monitoring, by the first wireless communication device during the first TXOP, for at least one of a channel reservation request for the third TXOP or a channel reservation response for the third TXOP from the second network operator.

7. The method of claim 1, wherein the reservation period and the response period are spaced apart by a predetermined time period.

8. The method of claim 1, wherein the channel reservation request includes timing information associated with the response period, and wherein the timing information is based on a capability of the first wireless communication device or the second wireless communication device.

9. The method of claim 1, further comprising:
detecting, by the first wireless communication device, a channel reservation request for a second TXOP, the channel reservation request including timing information associated with a response monitoring period for the second TXOP; and
monitoring, by the first wireless communication device during the response monitoring period, for a channel reservation response for the second TXOP.

10. The method of claim 1, wherein the first wireless communication device is a base station, and wherein the second wireless communication device and the third wireless communication device correspond to different user equipment devices or a same user equipment device.

11. The method of claim 1, wherein the first wireless communication device is a user equipment device, and wherein the second wireless communication device and the third wireless communication device correspond to a same base station.

12. An apparatus comprising:
a transceiver configured to:
communicate, with a first wireless communication device during a reservation period, a channel reservation request for a first transmission opportunity (TXOP) in a spectrum;
communicate, with the first wireless communication device during a response period in response to the channel reservation request, a channel reservation response; and
communicate, with a second wireless communication device during a first time period between the reservation period and the response period, a first communication signal different from the channel reservation request.

13. The apparatus of claim 12, wherein the reservation period, the first time period, and the response period are within the first TXOP, and wherein the transceiver is further configured to:
communicate, with a third wireless communication device during a second time period after the response period, a second communication signal based on a schedule determined independent of the channel reservation response.

14. The apparatus of claim 13, further comprising a processor configured to perform, during a third time period between the response period and the second time period, a listen-before-talk (LBT) in the spectrum.

15. The apparatus of claim 13, wherein the first TXOP includes a period designated to a first network operator and a period for sharing among a plurality of network operators including the first network operator, wherein the reservation period, the first time period, the second time period, and the response period are within the period designated to the first network operator.

16. The apparatus of claim 12, wherein the reservation period, the first time period, and the response period are within a second TXOP before the first TXOP.

17. The apparatus of claim 16, wherein the apparatus is associated with a first network operator, wherein a second network operator has a higher priority than the first network operator in a third TXOP after the first TXOP, and wherein the apparatus further comprises a processor configured to monitor, during the first TXOP, for at least one of a channel reservation request for the third TXOP or a channel reservation response for the third TXOP from the second network operator.

18. The apparatus of claim 12, wherein the reservation period and the response period are spaced apart by a predetermined time period.

19. The apparatus of claim 12, wherein the channel reservation request includes timing information associated with the response period, and wherein the timing information is based on a capability of the first wireless communication device or the first wireless communication device.

20. The apparatus of claim 12, further comprising a processor configured to:
   detect a channel reservation request for a second TXOP, the channel reservation request including timing information associated with a response monitoring period for the second TXOP; and
   monitor, during the response monitoring period, for a channel reservation response for the second TXOP.

21. The apparatus of claim 12, wherein the apparatus is a base station, and wherein the first wireless communication device and the second wireless communication device correspond to different user equipment devices or a same user equipment device.

22. The apparatus of claim 12, wherein the apparatus is a user equipment device, and wherein the first wireless communication device and the second wireless communication device correspond to a same base station.

23. A non-transitory computer-readable medium having computer executable code recorded thereon, the computer executable code when executed by one or more processors at a first wireless communication device causes the first wireless communication device to:
   communicate, with a second wireless communication device during a reservation period, a channel reservation request for a first transmission opportunity (TXOP) in a spectrum;
   communicate, with the second wireless communication device during a response period in response to the channel reservation request, a channel reservation response; and
   communicate, with a third wireless communication device during a first time period between the reservation period and the response period, a first communication signal different from the channel reservation request.

24. The non-transitory computer-readable medium of claim 23, wherein the reservation period, the first time period, and the response period are within the first TXOP, wherein the computer executable code when executed by the one or more processors further causes the first wireless communication device to:
   communicate, with a fourth wireless communication device during a second time period after the response period, a second communication signal based on a schedule determined independent of the channel reservation response; and
   perform, during a third time period between the response period and the second time period, a listen-before-talk (LBT) in the spectrum, wherein the first TXOP includes a period designated to a first network operator and a period for sharing among a plurality of network operators including the first network operator, wherein the reservation period, the first time period, the second time period, and the response period are within the period designated to the first network operator.

25. The non-transitory computer-readable medium of claim 23, wherein the reservation period, the first time period, and the response period are within a second TXOP before the first TXOP, wherein the first wireless communication device is associated with a first network operator, wherein a second network operator has a higher priority than the first network operator in a third TXOP after the first TXOP, and wherein the computer executable code when executed by the one or more processors further causes the first wireless communication device to:
   monitor, during the first TXOP, for at least one of a channel reservation request for the third TXOP or a channel reservation response for the third TXOP from the second network operator.

26. The non-transitory computer-readable medium of claim 23, wherein the reservation period and the response period are spaced apart by a predetermined time period.

27. The non-transitory computer-readable medium of claim 23, wherein the channel reservation request includes timing information associated with the response period, and wherein the timing information is based on a capability of the first wireless communication device or the second wireless communication device.

28. The non-transitory computer-readable medium of claim 23, wherein the computer executable code when executed by the one or more processors further causes the first wireless communication device to:
   detect a channel reservation request for a second TXOP, the channel reservation request including timing information associated with a response monitoring period for the second TXOP; and
   code for causing the first wireless communication device to monitor, during the response monitoring period, for a channel reservation response for the second TXOP.

29. The non-transitory computer-readable medium of claim 23, wherein the first wireless communication device is a base station, and wherein the second wireless communication device and the third wireless communication device correspond to different user equipment devices or a same user equipment device.

30. The non-transitory computer-readable medium of claim 23, wherein the first wireless communication device is a user equipment device, and wherein the second wireless communication device and the third wireless communication device correspond to a same base station.

* * * * *